US005781672A

United States Patent [19]
Cutts

[11] Patent Number: 5,781,672
[45] Date of Patent: Jul. 14, 1998

[54] LOW PROFILE OPTICAL FIBER SWITCH

[75] Inventor: Timothy Philip Cutts, Ottawa, Canada

[73] Assignee: JDSFitel Inc., Nepean, Canada

[21] Appl. No.: 754,031

[22] Filed: Dec. 3, 1996

[51] Int. Cl.$^6$ .................................................. G02B 6/35
[52] U.S. Cl. ............................... 385/22; 385/21; 385/25
[58] Field of Search ................................ 385/15–23, 25, 385/26

[56] References Cited

U.S. PATENT DOCUMENTS

| | | | |
|---|---|---|---|
| 4,088,387 | 5/1978 | Lewis | 385/20 |
| 4,378,144 | 3/1983 | Duck et al. | 385/16 |
| 4,896,935 | 1/1990 | Lee | 385/22 |
| 5,031,986 | 7/1991 | Mori | 385/25 |
| 5,317,659 | 5/1994 | Lee | 385/22 |
| 5,420,946 | 5/1995 | Tsai | 385/22 |
| 5,629,993 | 5/1997 | Smiley | 385/22 |

FOREIGN PATENT DOCUMENTS

| | | | |
|---|---|---|---|
| 2581204 | 10/1986 | France | 385/25 |

*Primary Examiner*—John D. Lee
*Attorney, Agent, or Firm*—Teitelbaum & Associates

[57] ABSTRACT

A low profile optical switching device has a housing with a width and length considerably greater than its height, a motor having an upright shaft extending less than the height of the housing, a circular faceplate surrounding an upper end portion of the shaft and having a diameter considerably larger than the length of the shaft, and a plurality of first optical fibers each having a fixed fiber end portion held by the faceplate. The fixed fiber end portions, usually constituted by lenses, are arranged so as to define a substantially cylindrical imaginary surface co-axial with and communicating with the faceplate. These fixed fiber end portions can receive light from a further optical fiber having a movable end portion carried by an arm extending radially from the motor shaft and which moves around a circular path adjacent the fixed fiber end portions, the light being transmitted via a prism mounted on the arm adjacent the movable fiber end portion.

9 Claims, 4 Drawing Sheets

LOW PROFILE OPTICAL FIBER SWITCH

FIELD OF THE INVENTION

This invention relates to optical switches of the kind which allow an optical signal to be switched between a plurality of waveguides or optical fibers (hereinafter referred to simply as optical fibers) having fixed end portions and one or more further optical fibers having a movable end portion or portions.

BACKGROUND OF THE INVENTION

Optical fiber switches are known having a linear or circular array of fixed optical fiber ends, which may be the ends of output fibers, and a movable single fiber end, which may be the end of an input fiber, and which can be moved selectively into juxtaposition to each of the fixed fiber ends in turn so that a light signal can be transmitted from the movable fiber to any one of the fixed fibers, or vice versa. Switches of this kind are shown, for example in the following U.S. patents:

U.S. Pat. No. 4,378,144, issued Mar. 29,1983 to Duck et al.;

U.S. Pat. No. 4,834,488, issued May 30,1989 to Lee;

U.S. Pat. No. 4,896,935, issued Jan. 30,1990 to Lee;

U.S. Pat. No. 5,317,659, issued May 31,1994 to Lee; and

U.S. Pat. No. 5,420,946, issued May 30,1995 to Tsai.

In order for the optical switch to couple light efficiently from one optical fiber to another, it has been usual to provide collimating lenses on the facing optical fiber ends to collimate the light that travels across the gap from one fiber end to another. Normally, so. called graded index (GRIN) lenses are used for this function. However, in accordance with our abandoned U.S. Pat. application Ser. No. 08/567,420, the collimating lenses on at least the fixed fiber ends can be eliminated by using so-called "expanding-core" type optical fiber, otherwise known as "beam expanding" or "expanded mode field diameter" (or expanded MFD)) type fiber. This type of fiber has a core which expands towards the end of the fiber. Such fiber ends produce a light beam which can pass to another spaced optical fiber end without undue losses.

Known optical fiber switches of the type described in the above patents occupy a fair amount of space, and in particular are unsuited to being fitted within a low profile housing or receptacle. A low profile would sometimes be desirable; for example there is a need for a switch which can be accommodated in a shallow drawer which is also of limited width. A low profile switch may also be useful when mounted on its side, for example in a rack with vertically elongated spaces.

Considering for example the various designs shown in the '144 patent to Duck et al., all these designs have a cylindrical indexing motor with a horizontal axis, and if mounted as shown the motors would occupy a fair amount of height. In most embodiments of this patent the motor has attached to it a face plate having an annular area which receives the fixed fiber end portions, this being of larger diameter than the motor and so increasing the height. If these designs of switch were to be mounted with the motor axis vertical, then substantial height would still be needed to accommodate not only the motor but also the movable fiber which, to avoid sharp bends, needs substantial space beyond the axial length of the main parts of the switch. In one embodiment, that of FIG. 3, the movable fiber is attached to the outer end of a carrier arm which is rotated by the motor shaft, and passes from the arm back into the hollow center of the shaft; while this reduces the axial length of the switch. about 1.5 to 2 inches is still required beyond the outer end of the shaft to accommodate the bend in the movable fiber, which cannot be overly sharp. In another embodiment, that of FIG. 7, the movable fiber is attached to a prism which re-directs the light from the movable fiber twice, through 180E, avoiding the need for the movable fiber to project beyond the arm which carries it. However, with this design, substantial space is required at the rear end of the motor, remote from the faceplate, to accommodate the moving fiber. It has also been found that the double reflection/re-redirection required by this design gives undesirable losses and additional alignment problems.

The Lee '659 patent refers to the considerable space required by the Duck et al. designs, and provides a design in which the face plate of the latter designs is replaced by a smaller diameter conical surface. This can allow the height of the device to be reduced to the diameter of the motor if this has a horizontal axis; however this height is still undesirably large. While offering reduced height in this way, the length of the switch (along the motor axis) is increased.

The '935 and '946 patents show designs of optical switch in which the movable fiber end is held by a carrier rotatable about a vertical axis, and cooperates with fixed fiber ends arranged radially. With a suitable motor, such an arrangement could give a low profile. However, the fact that the fixed fiber end portions are radial, along with limits oil the bending radius of the fibers, means that these switches would occupy substantial lateral space.

The present invention provides an optical switch which can be both of low profile, when mounted with its motor axis vertical, and can also occupy considerably less lateral space than that taken up by switches of the kind shown in the '935 and '946 patents and having a multiplicity of radial fiber ends. This switch can of course be rotated so that the motor axis is horizontal where the switch has to occupy a narrow upright space.

SUMMARY OF THE INVENTION

In accordance with the present invention, an optical switch has known components including:

a motor having a shaft, an array of first optical fibers each having a fixed fiber end portion, the fixed fiber end portions being disposed substantially parallel to the axis of the shaft in spaced-apart predetermined positions and having axes defining a substantially cylindrical imaginary surface co-axial with the shaft, a further optical fiber having a movable fiber end portion, and carrier means mounted on the shaft and carrying said movable fiber end portion around a circular path co-axial with the said imaginary surface and adjacent the fixed fiber end portions.

The switch of this invention however differs from known designs in that the movable fiber end portion extends largely radially relative to the shaft axis, and in that light re-direction means are mounted on the carrier means adjacent the movable fiber end portion so as to re-direct light between the movable fiber end portion and an adjacent fixed fiber end portion.

As in known devices, the motor rotates the carrier means to provide relative indexing movement of the movable fiber end portion along the circular path so that light can be transmitted between this end portion and selected ones of the fixed fiber end portions.

The fixed fiber end portions will normally be constituted by GRIN lenses, as will the movable fiber end portion or portions. However, in accordance with prior aforesaid abandoned U.S. Pat. application Ser. No. 08/567,420, the fixed fiber end portions may be end portions of expanding core fibers, without any lenses. Usually, the movable fibers will be the input fibers, and the fixed fibers will be the output fibers but this arrangement may be reversed.

The carrier means is preferably an arm extending radially from the shaft, and the further optical fiber has a portion extending along the arm from the movable fiber end portion to guide means adjacent the shaft axis. The movable fiber end portion is preferably orthogonal to each of the fixed fiber end portions, and the light re-directing means is preferably a prism producing a 90E change in direction of the light. However, it will be understood that the use of a radial movable fiber end and the arrangement of the fixed fiber end portions on an imaginary cylindrical surface is done for convenience and it is not required that the movable fiber end be strictly radial or that the imaginary surface be strictly cylindrical; the surface could be for example be conical as in U.S. Pat. No. 5,317,659 aforesaid, and the term "cylindrical" should be understood in this context.

Two of the said further, movable, fibers may be provided, each with a movable fiber end portion, these movable fiber end portions being arranged in side-by-side parallel relationship on the carrier, and a single light re-directing means may be provided of suitable width to transmit light between both of the two movable fiber end portions and selected fixed fiber end portions. The movable fiber end portions may be parallel or radial.

The device may be combined with housing means having a bottom and opposed sides and having a width and length greater than its height, preferably two or three times its height, the device being arranged so that the shaft axis is perpendicular to the bottom, i.e. normally vertical. This only applies to the orientation shown, however: the housing may alternatively be placed on edge to suit a narrow vertical space. The motor has a diameter larger than its axial length, and the diameter of the imaginary cylindrical surface is considerably greater than the length of the shaft, for example more than twice this length. Preferably, the shaft occupies at least 80% of the height of the housing.

The switching device may be suitable for use with a testing instrument having a circular array of detectors corresponding in position to the fixed fiber end portions and which is positioned parallel to the face plate. The arm, the movable fiber, and the shaft are all of sufficiently low profile to allow the testing device to be positioned close enough to the faceplate for adequate testing, say within 0.3 or 0.5 inches of the faceplate, without interfering with movement of the arm or parts carried thereby.

BRIEF DESCRIPTION OF THE DRAWINGS

Exemplary embodiments of the invention will now be described in conjunction with the drawing in which.

DETAILED DESCRIPTION

Figure 1:
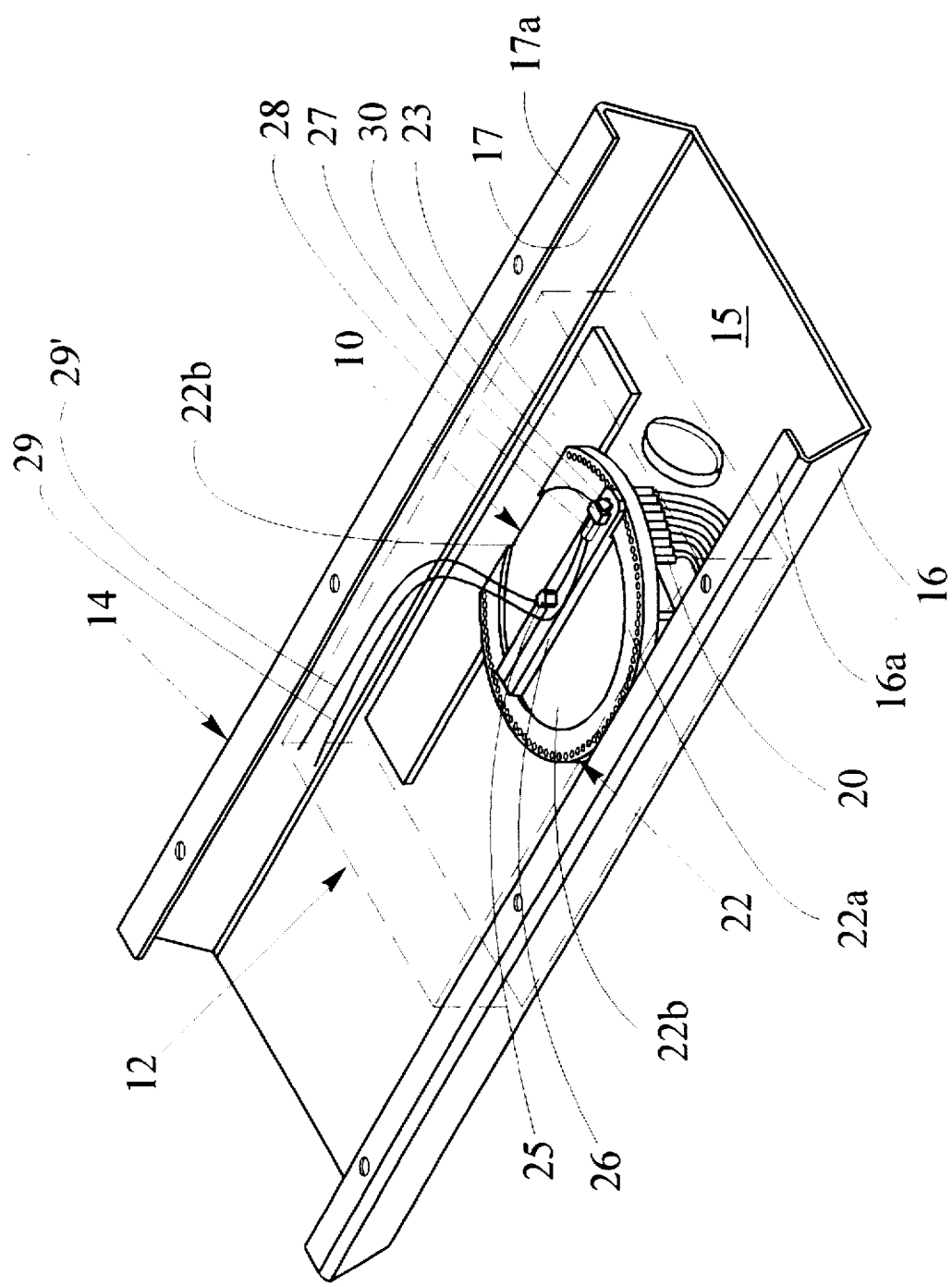
FIG. 1 a perspective view of an optical fiber switch in accordance with this invention,fitted within a drawer.
Figure 2:
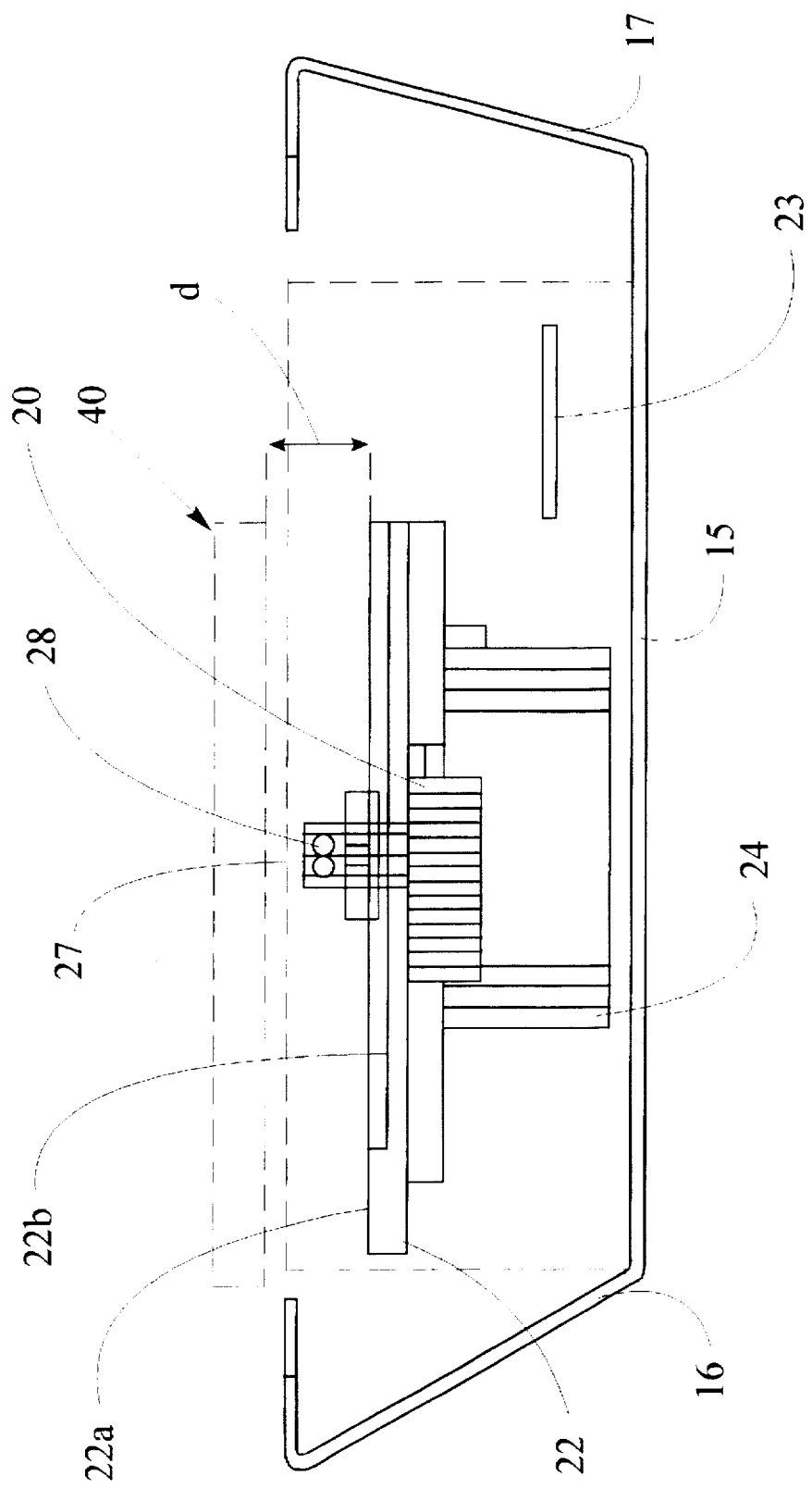
FIG. 2 is an end view of the switch shown in FIG. 1.

FIG. 1 and 2 show a first embodiment of optical switch 10 mounted in a box-like housing 12 having a width and length considerably greater than its height. The housing is itself fitted into a drawer 14 having a normally horizontal bottom 15, shallow left and right sides 16 and 17 with inturned flanges 16a and 17a, and an open top. The switch includes a circular array of 72 first, fixed, vertical fiber end portions each constituted by a cylindrical GRIN lens 20. The lenses 20 are spaced slightly apart in parallel bores formed along a circular path near to the outer edge of a normally horizontal faceplate 22 having a vertical axis, being located in a raised annular rim portion 22a of this faceplate. The lenses all have axes parallel with the faceplate axis to thus define a substantially cylindrical surface co-axial with this axis. The faceplate is largely circular but has a side facing the right drawer side 17 cut off along a chord parallel to this side, as indicated at 22b. In this embodiment, the cut off side of the faceplate, along with the fact that the faceplate is centered towards the left side 16 of the drawer, provides space within the right side of the drawer for electronic components (not shown) mounted on printed circuit board 23.

To the underside of the faceplate 22 is attached a stepping motor 24, best seen in FIG. 2, having a vertical shaft 25 extending along the faceplate axis and projecting through a hole in the center of the faceplate. This shaft has a carrier in the form of a radial indexing arm 26 which is partly recessed into the central part 22b of the faceplate. The outer end of arm 26 has mount 27 holding a pair of parallel, closely adjacent, and substantially radial bores each holding a GRIN lens 28, these lenses each having their inner ends connected to one of two further, movable optical fibers 29 and 29'. The Outer ends of these lenses 28 are close to an inner face of a triangular re-directing (prism 30 capable of re-directing light through 90E between one of the lenses 28 and the lens 20 of an adjacent fixed fiber end portion. The prism is wide enough to re-direct light from both lenses 28 into adjacent fixed fiber end portions. Alternatively, a mirror can be used in place of the prism, to re-direct light from both lenses 28 into adjacent fixed fiber end portions. Typically, the first, fixed fibers are output fibers, and one of the movable fibers 29 is an input fiber, the other movable fiber 29' being used as a spare channel or as a monitor fiber. The stepping motor 24 is arranged so that it can index the lenses 28 around the circle of lenses 20, bringing the lens 28 of the input fiber 29 successively into alignment with and in close proximity to each of the lenses 20 so that signals can pass between the input fiber lens 28 and a selected lens 20. The stepping motor may be controlled by a microprocessor so as rapidly to index the arm 26 to a desired position. Preferably, the stepping motor is arranged so as to rotate only within the limits set by the annular portion 22a of the faceplate to avoid undue twisting of the movable fibers 29 and 29'. Abrupt bends of the fiber are also avoided by guiding these fibers around a point on the arm near to the end of the shaft 25, so that the fibers 29 and 29' have a substantially straight portion extending along the arm from the shaft to the lenses 28.

The low profile of the switch is best appreciated with reference to FIG. 2. As shown, the height of the motor, including the upper projecting end of shaft 25, is less than one-half the diameter of the faceplate, and also less than one half the diameter of the imaginary surface occupied by the lenses 20. The shaft 25 preferably occupies at least 80% of the height of the housing. The height of the motor is preferably less than 1.5 inches, and in fact, the total depth of the drawer 14 may be less than 1.5 inches. The tact that the movable fibers 29 and 29' can be confined to a height below the top of the shaft means that it becomes practical to use the switch with a testing or monitoring instrument 40 mounted horizontally above the faceplate, as indicated in FIG. 2. This instrument may have a fixed annular arrangement of detectors, each opposite one of the fixed lenses 20, or may have a rotary arm carrying a detector or detectors into position over each of these lenses. The switch of this invention is particularly suitable for use with such an instrument since it allows the instrument to be spaced a small distance "d" from the faceplate, for example this distance will be less than 0.5 inches, and may be less than 0.3 inches.

Figure 3:
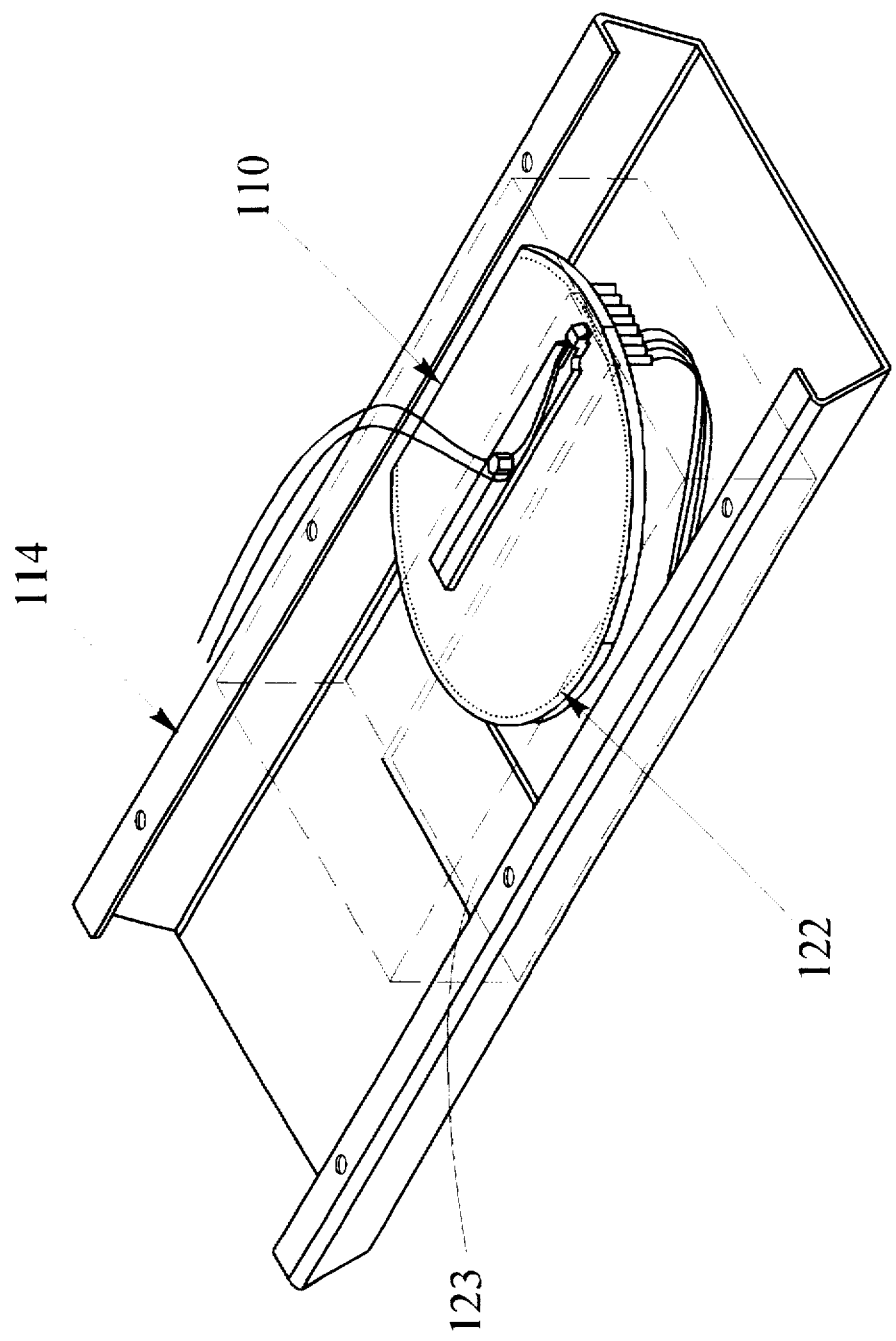
FIG. 3 is a view similar to FIG. 1 of a further embodiment of switch in accordance with the invention.
Figure 4:
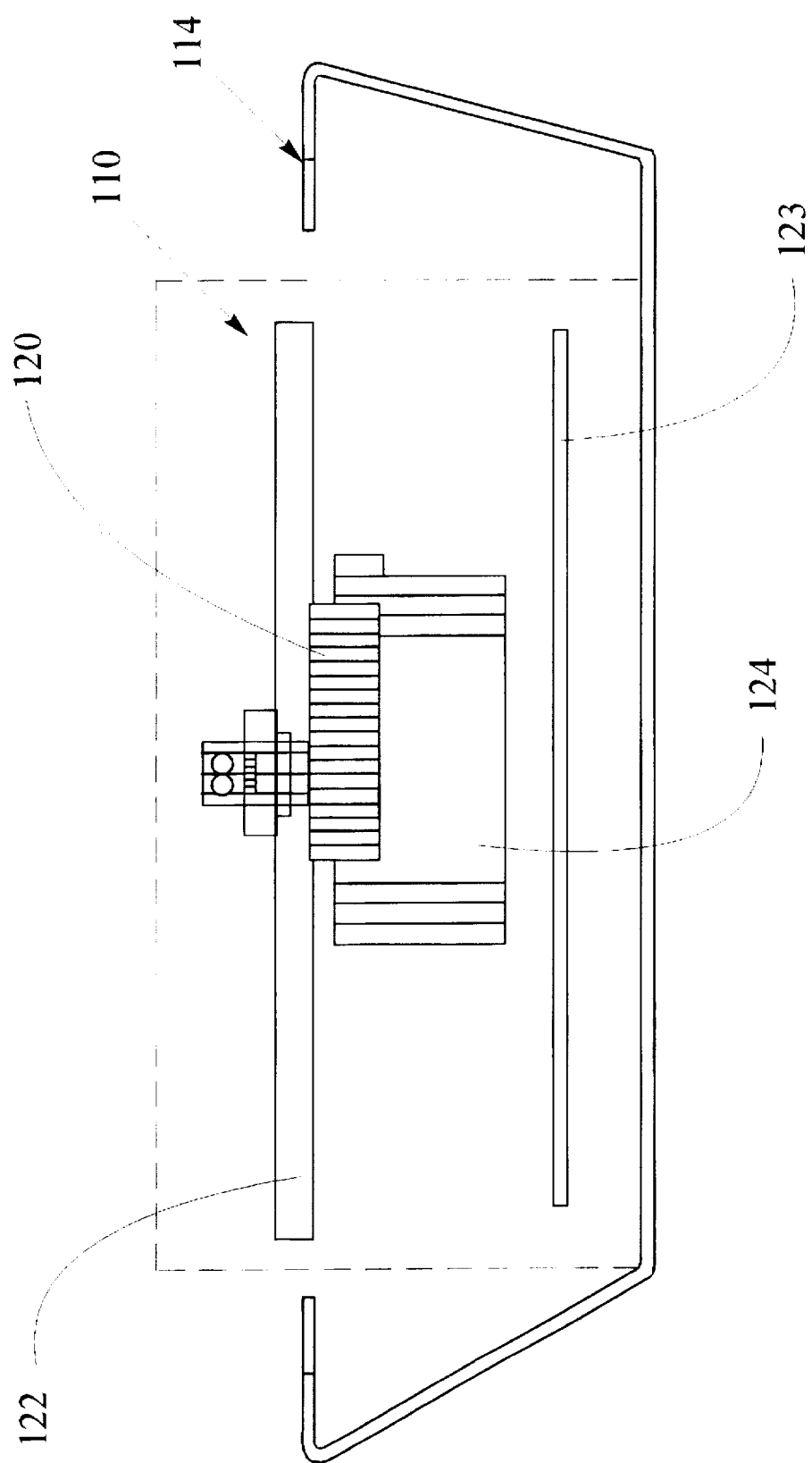
FIG. 4 is an end view of the switch of FIG. 3.

FIGS. 3 and 4 show a somewhat similar optical switch 110, but which has 144 fixed fiber ends with lenses 120 and consequently has a larger diameter of faceplate 122. To accommodate this larger diameter the faceplate is placed substantially in the lateral center of the drawer 114, and the printed circuit board 123 and components carried thereby are placed behind, rather than at the side of the motor 124. This increases the height requirement to about 1.75 to 2.00 inches. Another difference is that in this embodiment the faceplate is flat, with no central recessed part.

What is claimed is:

1. An optical switching device comprising:

a motor having a shaft, an array of first optical fibers each having a fixed fiber end portion, the fixed fiber end portions being disposed in spaced-apart predetermined positions and having axes defining a substantially cylindrical imaginary surface co-axial with said shaft, a further optical fiber having a movable fiber end portion, carrier leans mounted on said shaft and carrying said movable fiber end portion along a circular path co-axial with said shaft and adjacent said fixed fiber end portions, wherein said movable fiber end portion extends largely radially relative to the shaft axis, and wherein light redirecting means are mounted on said carrier means adjacent said movable fiber end portion so as to re-direct light between said movable fiber end portion and an adjacent fixed fiber end portion, said motor for rotating said shaft to provide relative indexing movement of said movable fiber end portion along said path so that light can be transmitted between said movable fiber end portion and selected ones of the fixed fiber end portions.

2. An optical switching device according to claim 1, wherein said carrier means is an arm extending radially from said shaft, and wherein said further optical fiber has a portion extending along said arm from said movable fiber end portion to guide means adjacent said shaft axis.

3. An optical switching device according to claim 1, wherein said movable fiber end portion is orthogonal to each of said fixed fiber end portions, and wherein said light re-direacting means is one of a prism and a mirror capable of re-redirecting light through 90°.

4. An optical switching device according to claim 1, wherein said movable fiber end portion is constituted by a collimating lens.

5. A device according to claim 1, in combination with housing means with a bottom and opposed sides and having a width and length greater than its height, the device being arranged so that the shaft axis is perpendicular to said bottom, the diameter of the imaginary cylindrical surface being considerably greater than the length of the shaft.

6. An optical switching device comprising:

a motor having a shaft an array of first optical fibers each having a fixed fiber end portion, the fixed fiber end portions being disposed in spaced-apart predetermined positions and having axes defining a substantially cylindrical imaginary surface co-axial with said shaft, a further optical fiber having a movable fiber end portion, carrier means mounted on said shaft and carrying said movable fiber end portion along a circular path co-axial with said shaft and adjacent said fixed fiber end portions, wherein said movable fiber end portion extends largely radially relative to the shaft axis, and wherein light re-directing means are mounted on said carrier means adjacent said movable fiber end portion so as to re-direct light between said movable fiber end portion and an adjacent fixed fiber end portion, wherein an additional further fiber is provided also having a movable fiber end portion, the movable fiber end portions being arranged in side-by-side parallel relationship on said carrier means, said light re-directing means being of suitable width to transmit light between both of said two movable fiber end portions and selected fixed fiber end portions, said motor for rotating said shaft to provide relative indexing movement of said movable fiber end portions along said path so that light can be transmitted between said movable fiber end portions and selected ones of the fixed fiber end portions.

7. An optical switching device comprising:

a housing having a width and length considerably greater than its height, a motor having an upright shaft extending less than the said height of the housing, a circular faceplate perpendicular to and co-axially surrounding an upper end portion of said shaft, said faceplate having a diameter considerably larger than the length of said shaft, a plurality of first optical fibers each having a fixed fiber end portion held by said circular faceplate, the fixed fiber end portions being disposed substantially parallel to the axis of the shaft in spaced-apart predetermined positions defining a substantially cylindrical imaginary surface communicating with said faceplate, a further optical fiber having a movable fiber end portion an arm extending radially from said shaft and carrying said movable fiber end portion around a circular path adjacent said fixed fiber end portions, with said movable fiber end portion extending radially relative to the shaft axis, light re-directing means mounted on said arm adjacent said movable fiber end portion so as to redirect light between said movable fiber end portion and an adjacent fixed fiber end portion, said motor providing relative indexing movement of said movable fiber end portion along said path so that light can be transmitted between said movable fiber end portion and a selected one of the fixed fiber end portions, said further fiber being located by guide means in such manner that it is substantially confined within the height of the housing.

8. An optical switching device according to claim 7, wherein the shaft occupies at least 80% of the height of the housing.

9. An optical switching device according to claim 7, suitable for use with a testing device having a circular array of detectors corresponding in position to said fixed fiber end portions and which is positioned parallel to said faceplate, and wherein the arm, movable fiber end portion, and shaft are all of sufficiently low profile to allow said testing device to be positioned within 0.5 inches of the faceplate without interfering with movement of the arm or parts carried thereby.

* * * * *